United States Patent
Inai

(10) Patent No.: US 8,605,560 B2
(45) Date of Patent: Dec. 10, 2013

(54) STORAGE SYSTEM AND STORAGE CONTROL METHOD

(71) Applicant: Fujitsu Limited, Kawasaki (JP)

(72) Inventor: Yusuke Inai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/738,013

(22) Filed: Jan. 10, 2013

(65) Prior Publication Data

US 2013/0242712 A1    Sep. 19, 2013

(30) Foreign Application Priority Data

Mar. 19, 2012 (JP) ................. 2012-062166

(51) Int. Cl.
*G11B 27/36* (2006.01)

(52) U.S. Cl.
USPC ........ 369/53.38; 369/30.27; 360/69; 711/114

(58) Field of Classification Search
None
See application file for complete search history.

(56) References Cited

U.S. PATENT DOCUMENTS

2008/0114932 A1*  5/2008  Kobayashi ............ 711/114

FOREIGN PATENT DOCUMENTS

| JP | 4-344922 | 12/1992 |
|---|---|---|
| JP | 2001-236253 | 8/2001 |
| JP | 2005-18484 | 1/2005 |

* cited by examiner

*Primary Examiner* — Thang Tran
(74) *Attorney, Agent, or Firm* — Staas & Halsey LLP

(57) ABSTRACT

A storage system includes plural drive devices and a control device. Each of the plural drive devices reads or writes data from or to a portable recording medium. The control device performs a parallel process in which a first process and a second process are performed in parallel. The first process is to write specified data to a first portable recording medium via a first drive device of the plural drive devices. The second process is to write the specified data to a second portable recording medium via a second drive device of the plural drive devices. The control device cancels, upon completion of either one of the first process and the second process, the other one of the first process and the second process.

16 Claims, 13 Drawing Sheets

| ID | COMMAND NAME | LV NAME | TAPE NAME | PRIORITY | EXECUTION FLAG |

- COMMAND INFORMATION
- COMMAND INFORMATION
- COMMAND INFORMATION
- COMMAND INFORMATION

| LV NAME | STORAGE DESTINATION TAPE NAME | LV SIZE (Kbyte) | COMPRESSION PERCENTAGE (%) | CACHE STATUS |
|---------|-------------------------------|-----------------|----------------------------|--------------|
| LV0000  | TP001                         | 1024000         | 90                         | ON           |
| LV0001  | TP003                         | 4096000         | 75                         | ON           |
| LV0002  | TP004                         | 2048000         | 50                         | OFF          |
| LV0003  | TP003                         | 8192000         | –                          | ON           |
| ⋮       | ⋮                             | ⋮               | ⋮                          | ⋮            |

| TAPE NAME | TAPE STATUS | ERROR DATE & ERROR SCORE | CUMULATIVE ERROR SCORE VALUE | EXPORT DELAY FREQUENCY | ⋮ |
|---|---|---|---|---|---|
| TAPE00 | NORMAL | 20111202 − 155132, 4<br>20111202 − 154443, 6<br>20111202 − 150214, 2<br>20111201 − 222144, 10<br>20111130 − 060302, 6<br>⋮ | 52 | 1 | ⋮ |
| TAPE01 | NORMAL | 20111202 − 123102, 4<br>20111202 − 101433, 4<br>20111202 − 065218, 2<br>20111130 − 185615, 2<br>20111130 − 060302, 6<br>⋮ | 20 | 2 | ⋮ |
| TAPE02 | NORMAL |  | 0 | 1 | ⋮ |
| TAPE03 | NORMAL |  | 0 | 0 | ⋮ |
| ⋮ | ⋮ | ⋮ | ⋮ | ⋮ | ⋮ |

| DRIVE NAME | DRIVE STATUS | ERROR DATE & ERROR SCORE | CUMULATIVE ERROR SCORE VALUE | EXPORT DELAY FREQUENCY | ⋮ |
|---|---|---|---|---|---|
| DRV00 | NORMAL | 20111202 − 155132, 4<br>20111202 − 154443, 6<br>20111202 − 150214, 2<br>20111201 − 222144, 10<br>20111130 − 060302, 6<br>⋮ | 88 | 3 | ⋮ |
| DRV01 | NORMAL | 20111202 − 123102, 6<br>20111202 − 101433, 6<br>20111202 − 065218, 2<br>20111130 − 185615, 10<br>20111130 − 060302, 6<br>⋮ | 30 | 1 | ⋮ |
| DRV02 | NORMAL | | 0 | 0 | ⋮ |
| DRV03 | NORMAL | | 0 | 0 | ⋮ |

STORAGE SYSTEM AND STORAGE CONTROL METHOD

CROSS-REFERENCE TO RELATED APPLICATION

This application is based upon and claims the benefit of priority of the prior Japanese Patent Application No. 2012-062166, filed on Mar. 19, 2012, the entire contents of which are incorporated herein by reference.

FIELD

The embodiments discussed herein are related to a storage system and a storage control method.

BACKGROUND

Portable recording media include magnetic tapes, optical disks, and magneto-optical disks. In particular, magnetic tapes are being used as a recording medium for achieving a large-capacity storage area at the backend of a storage system.

Examples of a technology for recording data on a portable recording medium include a technology of recording data on multiple recording media in such a manner that the data is duplexed and a technology of recording multiple data sets or divided data in such a manner that the data sets or divided data are distributed to multiple recording media.

Japanese Laid-open Patent Publication No. 4-344922, Japanese Laid-open Patent Publication No. 2001-236253, and Japanese Laid-open Patent Publication No. 2005-18484 disclose related techniques.

When writing data to a portable recording medium, the writing may stop due to, for example, occurrence of a temporary abnormality. In this case, a retry of the writing may allow the data write process to be completed. However, the time taken before the data write process is completed would become longer by a time period corresponding to the retry of the writing.

SUMMARY

According to an aspect of the present invention, provided is a storage system including plural drive devices and a control device. Each of the plural drive devices reads or writes data from or to a portable recording medium. The control device performs a parallel process in which a first process and a second process are performed in parallel. The first process is to write specified data to a first portable recording medium via a first drive device of the plural drive devices. The second process is to write the specified data to a second portable recording medium via a second drive device of the plural drive devices. The control device cancels, upon completion of either one of the first process and the second process, the other one of the first process and the second process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of information registered in a command queue;

FIG. 7 is a diagram illustrating an example of information registered in a volume management table;

FIG. 8 is a diagram illustrating an exemplary configuration of an export magnetic tape management table;

FIG. 9 is a diagram illustrating an exemplary configuration of a drive management table;

DESCRIPTION OF EMBODIMENTS

Hereafter, embodiments will be described with reference to the accompanying drawings.

First Embodiment

Figure 1:
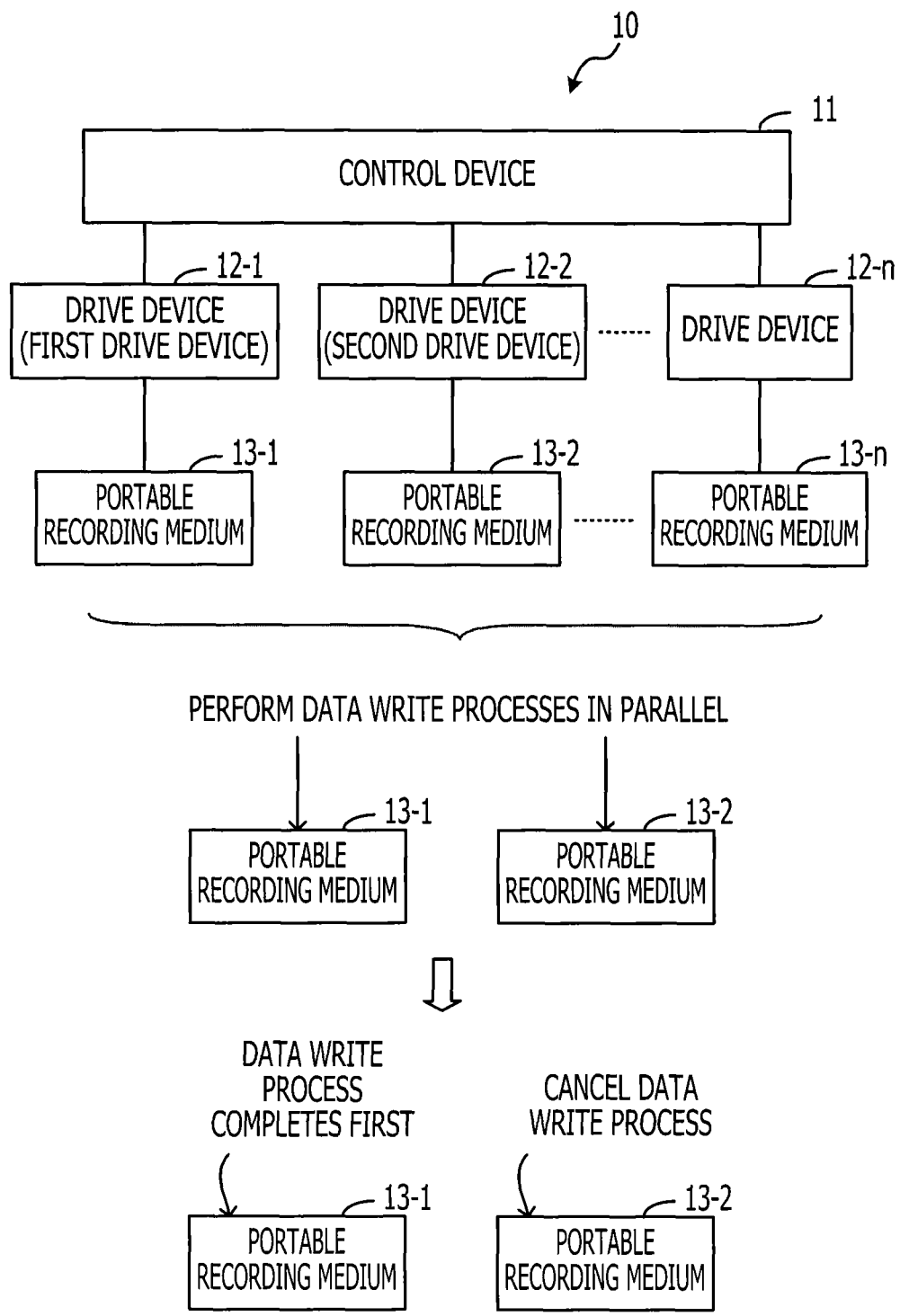
FIG. 1 is a diagram illustrating an exemplary configuration of a storage system according to a first embodiment.

FIG. 1 is a diagram illustrating an exemplary configuration of a storage system according to a first embodiment. A storage system 10 includes a control device 11, drive devices 12-1 to 12-n and portable recording media 13-1 to 13-n.

The drive devices 12-1 to 12-n read or write data from or to the portable recording media 13-1 to 13-n, respectively.

The control device 11 performs, in parallel, a process of writing data to the portable recording medium 13-1 via the drive device 12-1 of the drive devices 12-1 to 12-n and a process of writing data to the portable recording medium 13-2 via the drive device 12-2 of the drive devices 12-1 to 12-n. The control device 11 may select any two drive devices to be used to write data.

Upon completion of the process of writing data to one of the portable recording media 13-1 and 13-2, the control device 11 cancels the process of writing data to the other portable recording medium. For example, assume that the control device 11 performs data write processes on the portable recording media 13-1 and 13-2 in parallel. If the data writing to the portable recording medium 13-1 is completed earlier than the data writing to the portable recording medium 13-2, the control device 11 cancels the data write process to the portable recording medium 13-2.

Assume that a data write process is performed on a single portable recording medium. If the writing stops due to occurrence of an abnormality or the like, the data write process may be retried. Thus, the write process completion time would be delayed. On the other hand, the storage system 10, as described above, performs data write processes on the portable recording media 13-1 and 13-2 in parallel and, upon completion of the data write process to one portable recording medium (the portable recording medium 13-1), cancels the data write process to the other portable recording medium (the portable recording medium 13-2).

As seen above, data write processes to two portable recording media are performed in parallel. Therefore, even when an abnormality occurs in the data write process to either portable recording medium, there is a high possibility that the data write process to the other will be completed properly. Since the portable recording medium where the data write process has been completed earlier is regarded as an effective portable recording medium, the data write process does not have to be retried. As a result, it is possible to suppress a delay in the write completion time caused by a write retry process.

An embodiment where the storage system 10 is applied to a virtual tape library system will be described below.

Second Embodiment

Figure 2:
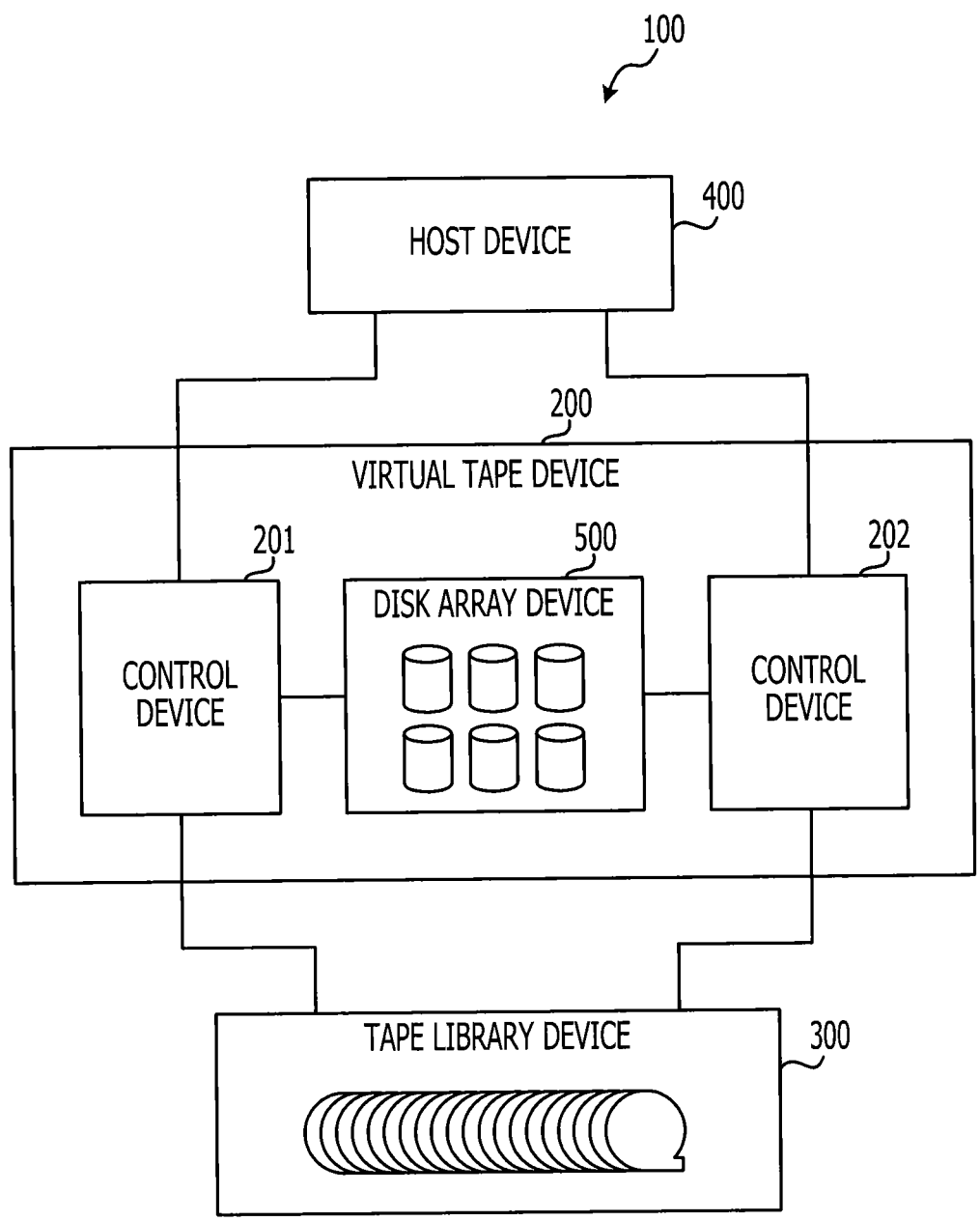
FIG. 2 is a diagram illustrating an exemplary configuration of a storage system according to a second embodiment.

FIG. 2 is a diagram illustrating an exemplary configuration of a storage system according to a second embodiment. A storage system 100 includes a virtual tape device 200, a tape library device 300, and a host device 400.

The tape library device 300 is a storage device that uses magnetic tapes as recording media. As will be discussed later, the tape library device 300 includes multiple tape drives (corresponding to the drive devices 12-1 to 12-n of FIG. 1) for accessing data stored in magnetic tapes, a mechanism for conveying a tape cartridge which houses a magnetic tape, and the like.

For example, the tape library device 300 may be provided in the casing where the virtual tape device 200 is provided.

The virtual tape device 200 includes control devices 201 and 202 (corresponding to the control device 11 of FIG. 1) and a disk array device 500. The disk array device 500 is a storage device including multiple hard disk drives (HDDs).

While the control devices 201 and 202 and the disk array device 500 are provided in the same casing in this embodiment, these devices may be provided in different casings.

The control devices 201 and 202 control data transfer operations between the host device 400 and the disk array device 500 and data transfer operations between the disk array device 500 and the tape library device 300.

The control devices 201 and 202 are configured to be redundant and perform control so that the storage system 100 serves as a hierarchical virtual tape library system that uses the magnetic tapes in the tape library device 300 as backend library devices and the HDDs in the disk array device 500 as cache devices. This virtual tape library system is configured such that the host device 400 may virtually use a large-capacity storage area achieved by the tape library device 300 via the disk array device 500.

Storage media used as the backend of the virtual tape library system include magnetic tapes, as well as portable recording media such as optical disks and magneto-optical disks.

Storage devices used as the cache devices of the virtual tape library system include HDDs, as well as solid state drives (SSDs).

The control devices 201 and 202 control data transfer operations with respect to different logical volumes. Further, even when one of the control devices 201 and 202 fails, only the other control device may continue operating the virtual tape library system.

Further, the control devices 201 and 202 may perform an "export process" of copying data stored in a logical volume whose ejection is asked for by the host device 400 to a magnetic tape for ejection and ejecting the magnetic tape from the tape library device 300. The logical volume in the magnetic tape ejected through the export process may be used, for example, in another virtual tape library system.

The host device 400 accesses a logical volume in the virtual tape library system by issuing an access request to at least one of the control devices 201 and 202 in response to an input operation by a user. The host device 400 also may specify any logical volume and cause the control devices 201 and 202 to perform a process of exporting the specified logical volume.

Figure 3:
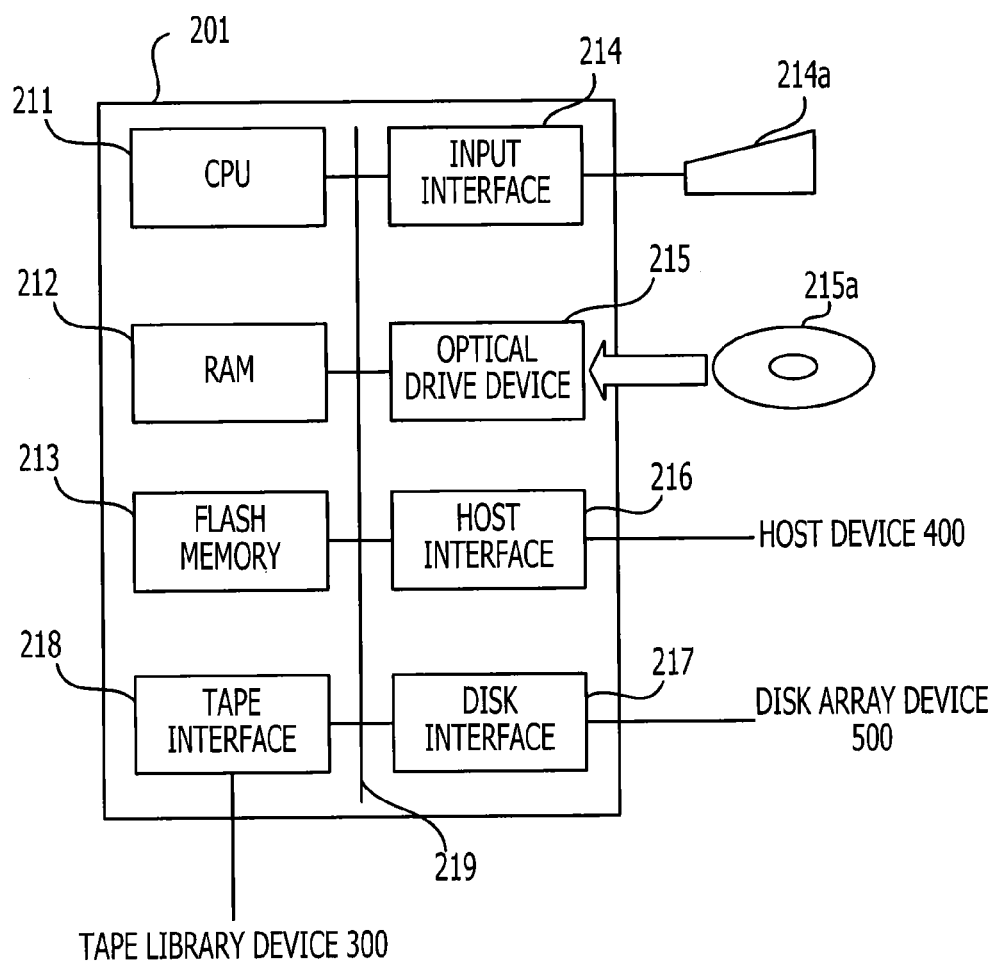
FIG. 3 is a diagram illustrating an exemplary hardware configuration of a control device.

Next, a hardware configuration of the control device 201 will be described. FIG. 3 is a diagram illustrating an exemplary hardware configuration of a control device. The control devices 201 and 202 have similar hardware configurations and may perform similar processes. For this reason, the configuration of the control device 201 and a process performed thereby will be described, and the control device 202 will not be described.

For example, the control device 201 is realized as a computer as illustrated in FIG. 3. The control device 201 is entirely controlled by a central processing unit (CPU) 211. A random access memory (RAM) 212 and multiple peripheral devices are coupled to the CPU 211 via a bus 219.

The RAM 212 is used as a primary storage of the control device 201. At least part of a firmware program to be executed by the CPU 211 is temporarily stored in the RAM 212. Various types of data used in processing by the CPU 211 are stored in the RAM 212.

The peripheral devices coupled to the bus 219 include a flash memory 213, an input interface 214, an optical drive device 215, a host interface 216, a disk interface 217, and a tape interface 218.

The flash memory 213 is used as a secondary storage of the control device 201. Firmware programs and various types of data are stored in the flash memory 213. Other types of non-volatile storage device such as an HDD may be used as the secondary storage.

An input device 214a having various operation keys may be coupled to the input interface 214. The input interface 214 transmits a signal from the input device 214a to the CPU 211 via the bus 219. The input device 214a may be included in the control device 201.

The optical drive device 215 reads data recorded in an optical disk 215a using laser beam or the like. The optical disk 215a is a portable recording medium where data is recorded in such a manner that the data may be read by optical reflection.

Examples of the optical disk 215a include a DVD (digital versatile disc), a DVD-RAM, a CD-ROM (compact disc read only memory), a CD-R (recordable)/RW (rewritable).

The host interface 216 is a communication interface for transmitting or receiving data to or from the host device 400. The disk interface 217 is a communication interface for transmitting or receiving data to or from the disk array device 500. The tape interface 218 is a communication interface for transmitting or receiving data to or from the tape library device 300.

As with the control device 201, the host device 400 may be realized as a computer including a CPU, a RAM, peripheral devices, and the like.

A hardware configuration as described above allows processing functions according to this embodiment to be performed. To perform the processing functions of this embodiment using a computer, there is provided a program in which a process performed by the functions of the control device 201 is written.

By executing the program using the computer, the processing functions are performed on the computer. The program in which the process is written may be recorded in a computer-readable recording medium.

Computer-readable recording media include magnetic storage devices, optical disks, magneto-optical storage media, and semiconductor memories. Magnetic storage devices include HDDs, flexible disks (FDs), and magnetic tapes. Optical disks include DVDs, DVD-RAM, and CD-ROM/RW. Magneto-optical storage media include magneto-optical disks (MOs). Note that a recording medium for recording programs does not contain temporary propagation signals.

To distribute a program, portable recording media such as DVDs and CD-ROMs in which the program is recorded are sold. Alternatively, a program stored in a storage device of a server computer may be transferred from the server computer to another computer via a network.

A computer for executing programs stores, in its own storage, a program recorded in a portable recording medium or a program transferred from a server computer. The computer then reads the program from its own storage and performs a process according to the program.

The computer may directly read a program from a portable recording medium and perform a process according to the program. The computer may also perform, each time a program is transferred from the server computer, a process according to the received program.

At least some of the above-mentioned processing functions may be realized as an electronic circuit such as a digital signal processor (DSP), an application specific integrated circuit (ASIC), or a programmable logic device (PLD).

Figure 4:
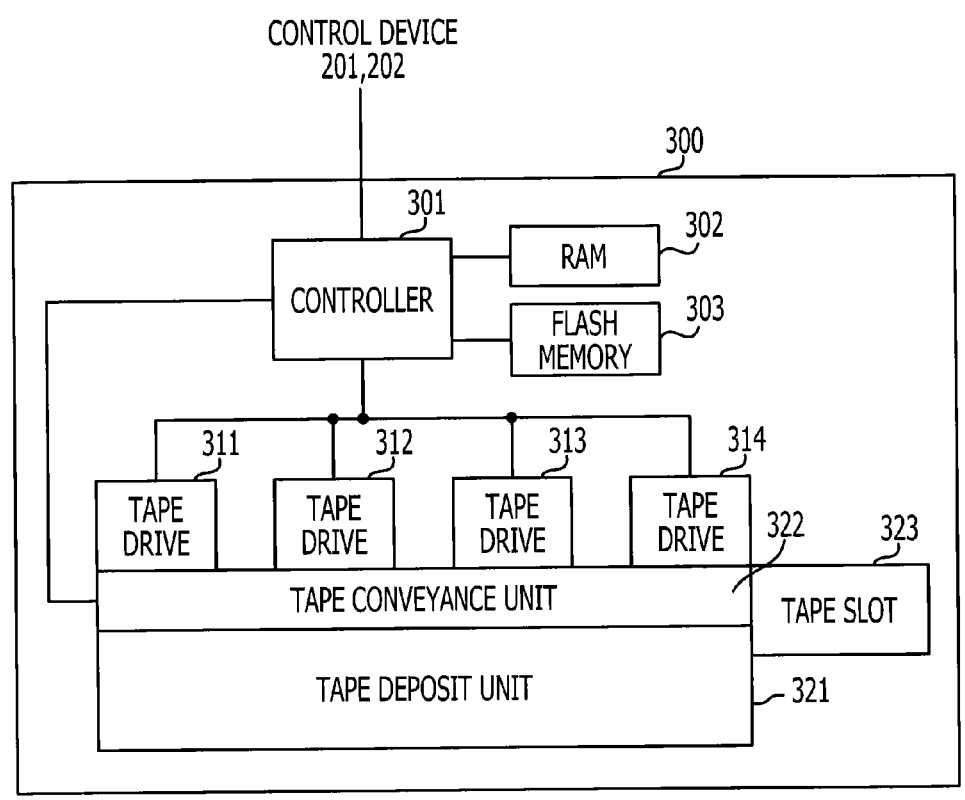
FIG. 4 is a diagram illustrating an exemplary hardware configuration of a tape library device.

Next, a hardware configuration of the tape library device 300 will be described. FIG. 4 is a diagram illustrating an exemplary hardware configuration of a tape library device. The tape library device 300 includes a controller 301, a RAM 302, a flash memory 303, tape drives 311 to 314 (corresponding to the drive devices 12-1 to 12-n of FIG. 1), a tape deposit unit 321, and a tape conveyance unit 322.

The controller 301 includes a CPU, for example, and centrally controls the entire tape library device 300. At least some of firmware programs to be executed by the controller 301 are temporarily stored in the RAM 302. Various types of data used in processing by the controller 301 are stored in the RAM 302. Firmware programs and various types of data are stored in the flash memory 303.

Tape cartridges conveyed by the tape conveyance unit 322 are mounted on the tape drives 311 to 314 one by one. Under the control of the controller 301, the tape drives 311 to 314 write or read data to or from the magnetic tapes in the mounted tape cartridges.

While the tape library device 300 includes, for example, four tape drives in this embodiment, the number of tape drives is not limited to a particular one as long as the number is two or more. Note that if the number of tape drives is three or more, it is possible to perform an export parallel process (to be discussed later) using two tape drives and simultaneously perform a process other than the export process using one of the remaining tape drives.

Multiple tape cartridges are stored in the tape deposit unit 321. The tape cartridges stored in the tape deposit unit 321 are broadly categorized into ones used as part of the virtual tape library system and ones used for an export process.

In the following description, magnetic tapes in the former tape cartridges will be referred to as "library magnetic tapes" and magnetic tapes in the latter tape cartridges will be referred to as "export magnetic tapes". The control devices 201 and 202 determine which magnetic tape is to be used for which purpose.

The tape conveyance unit 322 conveys tape cartridges under the control of the controller 301. For example, the tape conveyance unit 322 conveys a tape cartridge stored in the tape deposit unit 321 to one of the tape drives 311 to 314 and mounts the tape cartridge on the one of the tape drives 311 to 314. The tape conveyance unit 322 also unmounts a tape cartridge from one of the tape drives 311 to 314, conveys the tape cartridge to the tape deposit unit 321, and stores the tape cartridge in the tape deposit unit 321.

The tape slot 323 is formed in the tape conveyance unit 322. In response to a request from the controller 301, the tape conveyance unit 322 ejects, from the tape slot 323, a tape cartridge conveyed from the one of the tape drives 311 to 314 or tape deposit unit 321. The tape conveyance unit 322 may also convey a tape cartridge injected from the tape slot 323 to one of the tape drives 311 to 314 or the tape deposit unit 321.

Figure 5:
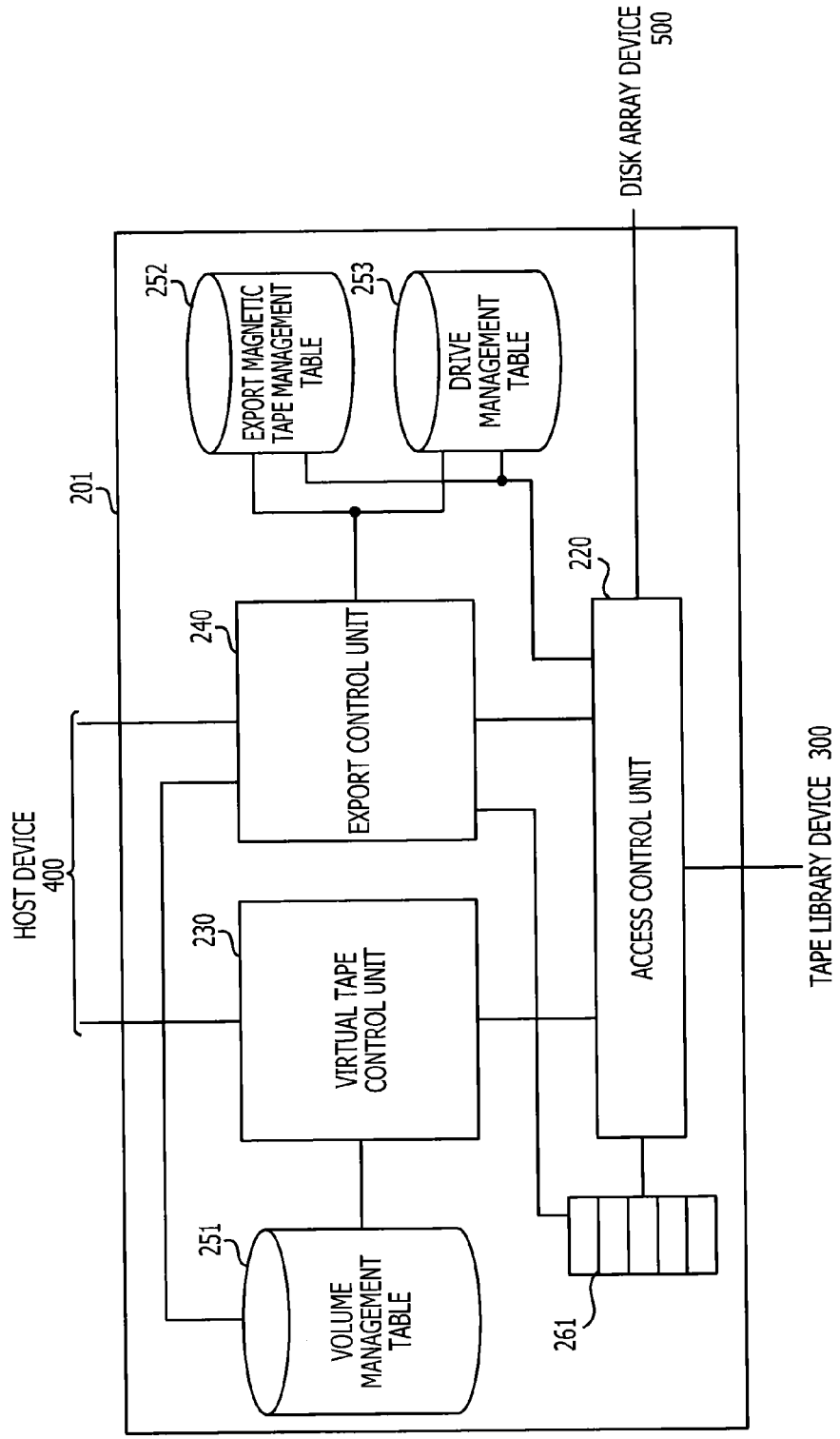
FIG. 5 is a diagram illustrating an example functional configuration of a control device.

Next, a function configuration of the control device 201 will be described. FIG. 5 is a diagram illustrating an exemplary functional configuration of a control device.

The control device 201 includes an access control unit 220, a virtual tape control unit 230, and an export control unit 240. The components perform respective processes when the CPU 211 of the control device 201 executes a given firmware program, for example.

A volume management table 251, an export magnetic tape management table 252, and a drive management table 253 are stored in a non-volatile storage device (e.g., flash memory 213) included in the control device 201. Further, a command queue 261 is generated in a storage device (e.g., RAM 212) included in the control device 201.

Next, operations of the access control unit 220 will be described. In accordance with instructions from the virtual tape control unit 230 and the export control unit 240, the access control unit 220 transfers data between an HDD in the disk array device 500 and a magnetic tape in the tape library device 300.

For example, when the access control unit 220 is instructed to write data to a magnetic tape by the virtual tape control unit 230 or export control unit 240, the access control unit 220 selects a tape drive for writing the data and notifies the tape library device 300 of the selected tape drive. The access control unit 220 then instructs the tape library device 300 to mount a magnetic tape on the selected tape drive. The access control unit 220 reads the data to be written, from the disk array device 500, transmits the data to the tape drive having the magnetic tape mounted thereon, and causes the tape drive to write the data to the magnetic tape.

The access control unit 220 also has a function of, in writing data read from the disk array device 500 to a magnetic tape, compressing the data to be written.

The access control unit 220 also has a function of, when an error occurs in reading or writing data from or to a magnetic tape through the tape drives 311 to 314, recording an error score corresponding to the type of the error. Specifically, when an error occurs, the access control unit 220 registers an error score corresponding to the type of the error in the drive management table 253 in such a manner that the error score is associated with the tape drive where the error has occurred.

Further, when an error occurs in writing data to an export magnetic tape, the access control unit 220 registers an error score corresponding to the type of the error in the export magnetic tape management table 252 in such a manner that the error score is associated with the magnetic tape where the error has occurred.

Hereafter, the command queue 261 will be described. FIG. 6 is a diagram illustrating an example of information registered in a command queue.

The access control unit 220 registers pieces of command information issued by the virtual tape control unit 230 or export control unit 240 in the command queue 261 in the order of issuance. Examples of information registered in the command queue 261 include "identifier (ID)", "command name", "logical volume (LV) name", "tape name", "priority", and "execution flag".

The "ID" is information for identifying command information. The "command name" is information for identifying the contents of an instruction. At least "recall", "asynchronous migration", "urgent migration", "export", and "magnetic tape initialization", which will be discussed later, are identified by the "command name".

The "LV name" is information for identifying a logical volume from which data is to be read or to which data is to be written. The "tape name" is information for identifying a magnetic tape to which data is to be written or from which data is to be read.

The "priority" is associated with a command name. For example, a command having a higher priority value is regarded as a command which is preferably executed earlier. The "priority" is determined with respect to each command name. However, for the "export" command, higher priority is set when executing "export" commands in parallel (in a redundant manner) than when executing a single "export" command.

The "execution flag" is flag information indicating whether a command is currently under execution. For example, the execution flag of a command is defaulted to "0"; when execution of the command is started, the access control unit 220 changes the execution flag to "1". Since four drives are provided in this embodiment, the execution flags of up to four pieces of command information in the command queue 261 are set to "1".

The access control unit 220 selects a tape drive on which a command is to be executed and performs a process corresponding to the command through the selected tape drive. The access control unit 220 processes commands registered in the command queue 261 in the descending order of priority. Upon completion of a process corresponding to a command, the access control unit 220 removes the command from the command queue 261.

When a command having higher priority than a command under execution is registered in the command queue 261 in a state where there is no available drive in the tape library device 300, the access control unit 220 stops processing one of commands having lower priority (a command whose execution has started most recently). The access control unit 220 then unmounts the magnetic tape that has been used to process the stopped command from the tape drive, mounts a magnetic tape to be used to process the command having higher priority on that tape drive, and executes the command having higher priority. Upon occurrence of an available drive, the access control unit 220 resumes the processing of the stopped command using the available drive.

Next, operations of the virtual tape control unit 230 will be described. In response to a request to access the virtual tape library system from the host device 400, the virtual tape control unit 230 accesses data stored in an HDD of the disk array device 500 as well as accessing data stored in a magnetic tape of the tape library device 300. Further, the virtual tape control unit 230 instructs the access control unit 220 to perform a process such as transmission or reception of data to or from the host device 400.

To control these processes, the virtual tape control unit 230 uses the volume management table 251 in which information for managing logical volumes is stored.

Hereafter, the volume management table 251 will be described. FIG. 7 is a diagram illustrating an example of information registered in a volume management table.

Records are generated in the volume management table 251 with respect to respective logical volumes. Examples of information, about a generated logical volume, registered in a record of the volume management table 251 include "LV name", "storage destination tape name", "LV size", "compression percentage", and "cache status".

The "LV name" is information for identifying a logical volume. The "storage destination tape name" is information for identifying a library magnetic tape in which a logical volume is stored. The "LV size" indicates the data size of a logical volume.

The "compression percentage" indicates, when compressing a logical volume and copying it to a magnetic tape, a ratio of a data size of the compressed logical volume to a data size of the yet-to-be-compressed logical volume. The access control unit 220 registers a value in the field of the "compression percentage" when the access control unit 220 completes a process of copying data stored in a logical volume to a library magnetic tape.

The "cache status" indicates whether a logical volume is cached. The "cache status" is set to "on" when a logical volume is cached. The "cache status" is set to "off" when the logical volume is not cached.

The virtual tape control unit 230 uses the volume management table 251 to perform, for example, a process as described below. Upon generating a new logical volume in response to a request from the host device 400 or the like, the virtual tape control unit 230 generates a record corresponding to the generated logical volume in the volume management table 251.

At this time, the virtual tape control unit 230 sets the "cache status" in the record corresponding to the generated logical volume to "on" and reserves a new logical volume area in the disk array device 500, as well as registering the size of the reserved logical volume area in the "logical volume size".

Subsequently, the virtual tape control unit 230 controls the access control unit 220 to cause the access control unit 220 to record the data which the virtual tape control unit 230 is instructed to write by the host device 400, in the logical volume in the disk array device 500.

Subsequently, at any time, the virtual tape control unit 230 causes the access control unit 220 to perform "asynchronous migration" to copy the logical volume in which the data has been recorded to a given library magnetic tape in the tape library device 300.

In performing asynchronous migration, the virtual tape control unit 230 receives, from the access control unit 220, information for identifying a library magnetic tape to which the logical volume is to be copied. The virtual tape control unit 230 then registers this identification information in "storage destination tape name" of a record corresponding to the logical volume.

Upon completion of the asynchronous migration, the virtual tape control unit 230 obtains the data size of the compressed logical volume from the access control unit 220, calculates a compression percentage, and registers the compression percentage in "compression percentage" of the corresponding record.

When the virtual tape control unit 230 receives a request to write data from the host device 400 and the disk array device 500 does not have a sufficient available area, the virtual tape control unit 230 cause the access control unit 220 to delete, from the disk array device 500, a logical volume whose last access time is the oldest. At this time, the virtual tape control unit 230 sets to "off" the "cache status" of a record corresponding to the logical volume deleted from the disk array device 500.

Note that when deleting the logical volume from the disk array device 500, the latest data stored in the logical volume may not have been copied to a library magnetic tape. In this case, the virtual tape control unit 230 causes the access control unit 220 to perform "urgent migration" to copy the logical volume to be deleted to a library magnetic tape. Upon completion of the urgent migration, the virtual tape control unit 230 deletes the logical volume from the disk array device 500.

Upon receiving a request from the host device 400 for reading data, the virtual tape control unit 230 determines whether a logical volume including the requested data is recorded in the disk array device 500, on the basis of the volume management table 251.

For example, assume that the virtual tape control unit 230 is requested to read data stored in a logical volume "LV0001" by the host device 400.

When the logical volume "LV0001" including the requested data is recorded in the disk array device 500, "cache status" of a record corresponding to the logical volume "LV0001" in the volume management table 251 is "on". In this case, the virtual tape control unit 230 reads the requested data from the logical volume "LV0001" in the disk array device 500 via the access control unit 220 and transmits the data to the host device 400.

In contrast, if there is a "cache miss" on the logical volume "LV0001" including the requested data, that is, the logical volume "LV0001" is not recorded in the disk array device 500, "cache status" of a record corresponding to the logical volume "LV0001" in the volume management table 251 is "off". In this case, the virtual tape control unit 230, via the access control unit 220, causes the tape library device 300 to mount a library magnetic tape storing the logical volume "LV0001" on one of the tape drives in the tape library device 300. The virtual tape control unit 230 then instructs the tape library device 300 to read the logical volume "LV0001" from the mounted library magnetic tape.

The virtual tape control unit 230 then causes the access control unit 220 to copy the data read from the library magnetic tape to the disk array device 500. The virtual tape control unit 230 also changes "cache status" of a record corresponding to the logical volume "LV0001" in the volume management table 251 from "off" to "on".

The above-described process of copying a logical volume including the requested data from a library magnetic tape to the disk array device 500 is called "recall".

Upon completion of the recall, the virtual tape control unit 230 reads, via the access control unit 220, the requested data from the logical volume "LV0001" copied to the disk array device 500 and transmits the data to the host device 400.

Instead of the above-mentioned "on" and "off", for example, three statuses, "dirty", "hit", and "miss", may be registered as "cache status".

The "dirty" indicates a state where the latest data of a logical volume is stored in the disk array device 500 but not stored in a library magnetic tape. The "hit" indicates a state where data stored in a logical volume of the disk array device 500 and data stored in a logical volume of a library magnetic tape are equivalent to each other. The "miss" indicates a state where data stored in a logical volume is not recorded in the disk array device 500 but recorded only in a library magnetic tape.

Assume that the three statuses are used. When a logical volume is cached, the "cache status" of a record corresponding to the logical volume is "dirty" or "hit". In contrast, when a logical volume is not cached, the "cache status" of a record corresponding to the logical volume is "miss".

In recent years, with increases in data amount and increases in the capacity of tape media, which are storage media, the processing time of an export process, in which a logical volume is backed up to an export magnetic tape, has been increased. In these circumstances, when a failure such as a hardware failure or tape medium failure occurs during an export process, a retry is performed. The execution of the retry may significantly delay the export process completion time. Further, compared to a normal process, an export process is not often given appropriate priority. For this reason, an export process is often placed on standby, delaying the export process completion time.

The process described below is intended to suppress a delay in an export process as described above.

Next, operations of the export control unit 240 illustrated in FIG. 5 will be described. In response to an instruction from the host device 400, the export control unit 240 causes the access control unit 220 to perform an export process.

Specifically, the export control unit 240 receives, from the host device 400, an export instruction associated with execution of dedicated software for virtual tape control, for example. The export control unit 240 then writes data stored in a specified logical volume out of the logical volumes on the disk array device 500 to a previously registered export magnetic tape in the tape library device 300.

In an export process, for example, one or multiple logical volumes and one export magnetic tape, which is a write destination, are specified in a single export instruction. Note that total capacity of the specified logical volumes does not exceed capacity of the specified export magnetic tape.

By performing the export process in this way, data stored in the specified logical volumes may be backed up to the export magnetic tape. The export magnetic tape may be ejected from the tape library device 300 and stored externally.

When specific conditions to be discussed later are met, the export control unit 240 performs export processes on multiple export magnetic tapes in parallel. The export control unit 240 regards an export magnetic tape, where the export process has been completed first, as an effective export magnetic tape and ejects the effective export magnetic tape. Hereafter, parallel execution of export processes will be also referred to as "export parallel process".

As for an export magnetic tape where the export process has not been completed first in the export parallel process, the export control unit 240 cancels the export process and restores the export magnetic tape to the state prior to the export process. Further, the export control unit 240 records the hardware (e.g., tape drive) and tape medium used in the cancelled export process as subjects to be monitored for a failure. Thus, when an event where the export process is not completed first occurs again when using the same hardware or tape medium in a later export process, the hardware or tape medium may be determined to have failed.

On the other hand, usually performing export processes in parallel would lead to a waste of resource. This is inefficient. For this reason, the export control unit 240 performs an export parallel process only if an export process may take time, in other words, only if specific conditions are met.

If there is no available tape drive due to another process (migration, etc.), an export process may be placed on standby. Accordingly, execution priority to perform an export parallel process is previously set. The setting of priority will be described later.

Next, specific conditions (parallel process execution conditions) that the export control unit 240 has to meet in order to perform an export parallel process will be described.

Only when the parallel process execution conditions are met, the export control unit 240 performs an export parallel process. When the parallel process execution conditions are not met, the export control unit 240 performs an export process singly (hereafter referred to as "export single process").

To simply reduce the export processing time, it is considered to usually perform export processes in parallel. However, since one export process occupies one tape drive, usually performing export processes in parallel may cause a lack of resources with respect to the tape drives.

Accordingly, parallel process execution conditions are set such that the advantage "avoidance of a delay in the export process completion time" may prevail over the disadvantage "a temporary lack of resources due to an export parallel process" when the export control unit 240 determines to perform export processes in parallel under the conditions. Only when the conditions are met, the export control unit 240 performs an export parallel process.

For example, the parallel process execution conditions include the following precondition and first to fifth conditions. Upon receiving an export instruction from the host device 400, the export control unit 240 performs an export parallel process if the precondition as well as two or more of the first to fifth conditions are met.

The export control unit 240 handles a magnetic tape where the export process has been completed first properly, as an effective export completed magnetic tape. Thus, even when the other export process is aborted or delayed, an apparent delay in the export completion time may be avoided. The respective conditions will be described below.

Precondition

Precondition is that a sum of the number of available tape drives and the number of tape drives in which a process having lower priority than an export parallel process is being performed is two or more.

Assuming that this precondition is used, for example, if there are four tape drives and a process having priority not lower than an export parallel process is being performed in three of the four tape drives, the export control unit 240 does not perform an export parallel process. Instead, the export control unit 240 performs an export single process using the remaining one tape drive.

If a process having priority not lower than an export parallel process is being performed in two of the four tape drives and if a process having priority lower than an export parallel process is being performed in remaining one tape drive, the export control unit 240 cancels the process having the lower priority and performs an export parallel process.

Three or more tape drives are preferably provided. For example, assume that three tape drives are provided. In this case, even when an export parallel process is being performed in two tape drives, the export control unit 240 may perform another process on the remaining one tape drive and continue operating the virtual tape library system.

First Condition

First condition is that total data capacity of logical volumes subjected to an export process exceeds a predetermined threshold.

Logical volumes having larger total data capacity take more time for an export process. Accordingly, the export control unit 240 may regard logical volumes that meet the first condition as logical volumes to be subjected to an export parallel process.

Second Condition

Second condition is that an average data size of logical volumes subjected to an export process falls below a predetermined threshold.

For example, assume that total data capacity of logical volumes subjected to an export process in one case is the same as total data capacity of logical volumes subjected to an export process in another case. Comparison is made between "a case where a small number of logical volumes having large capacity are specified" and "a case where a large number of logical volumes having small capacity are specified". The latter case has a higher possibility that the number of magnetic tapes to be mounted may increase than the former case. Thus, there is a high possibility that an export process may take more time in the latter case. Accordingly, the export control unit 240 may regard logical volumes that meet the second condition as logical volumes to be subjected to an export parallel process.

Third Condition

Third condition is that average compression percentage in writing data stored in logical volumes subjected to an export process to a tape falls below a predetermined threshold.

When writing a logical volume present in the disk array device 500 to an export magnetic tape, the data is compressed and thus the size of the logical volume is reduced.

A compression percentage is a percentage of a size reduction resulting from the compression of data. For example, when 100 Mbyte of data becomes 20 Mbyte of data by the compression, the compression percentage is 80%.

For logical volumes having the same data capacity before compressed, a logical volume having a lower compression percentage takes more time for an export process. Accordingly, the export control unit 240 may regard logical volumes that meet the third condition as logical volumes to be subjected to an export parallel process.

Compression percentage information of a logical volume is stored in the volume management table 251 when data stored in the logical volume is written to a magnetic tape. When an export instruction is issued with respect to a logical volume which has never been written to a magnetic tape, there is no compression percentage information. Accordingly, in response to the export instruction, the virtual tape control unit 230 compresses the logical volume, and the export control unit 240 obtains the compression percentage.

Fourth Condition

Fourth condition is that a cumulative value of past error scores of a tape drive used in an export process exceeds a threshold.

When a tape drive used in an export process has a higher cumulative value of past error scores, the possibility that a data write process is aborted may be increased. Accordingly, the export control unit 240 may regard logical volumes subjected to an export process as to be subjected to an export parallel process when the fourth condition is met.

Fifth Condition

Fifth condition is that a cumulative value of past error scores of an export magnetic tape used in an export process exceeds a threshold.

When an export magnetic tape used in an export process has a higher cumulative value of past error scores, the possibility that a data write process is aborted may be increased. Accordingly, the export control unit 240 may regard logical volumes subjected to an export process as to be subjected to an export parallel process when the fifth condition is met.

When the precondition as well as at least two of the first to fifth conditions is met, the export control unit 240 performs an export parallel process. Thus, the export control unit 240 may perform an export parallel process only when the "avoidance of a delay in the export process completion time" has higher importance than the "temporary lack of resources due to an export parallel process".

Another method may be used as a method for making a determination on the basis of the above-mentioned conditions. For example, the export control unit 240 may perform an export parallel process when only the precondition is met. Alternatively, the export control unit 240 may perform an export parallel process when any number of conditions out of the first to fifth conditions is met.

Next, the export magnetic tape management table 252 and the drive management table 253 will be described. The control device 201 manages the export magnetic tapes and the tape drives 311 to 314 using the export magnetic tape management table 252 and the drive management table 253, respectively.

FIG. 8 is a diagram illustrating an exemplary configuration of an export magnetic tape management table. In the export magnetic tape management table 252, "tape name", "tape status", "error date and error score", "cumulative error score value" and "export delay frequency" are registered as information for managing an export magnetic tape.

The "tape name" is information for identifying an export magnetic tape. The "tape status" is information indicating whether an export magnetic tape is available. When "normal" is registered, the export magnetic tape is available. In contrast, when "error" (failed) or "disable" (unavailable) is registered in the field of tape status, use of the tape is prohibited.

The "error date and error score" indicates the date when an error occurs in an export magnetic tape during an export process and an error score corresponding to the type of the error. For example, past ten pieces of information are registered in the "error date and error score" with respect to one tape name.

The "cumulative error score value" is a cumulative value of error scores. For example, if past ten pieces of information are registered in the "error date and error score", the cumulative value of the ten error scores is stored in the "cumulative error score value". The "export delay frequency" indicates number of times the export process has not been completed first during an export parallel process.

FIG. 9 is a diagram illustrating an exemplary configuration of a drive management table. In the drive management table 253, "drive name", "drive status", "error date and error score", "cumulative error score value" and "export delay frequency" are registered as information for managing a tape drive.

The "drive name" is information for identifying a tape drive. The "drive status" is information indicating whether a tape drive is available. When "normal" is registered, the tape drive is available. In contrast, when "error" (failed) or "disable" (unavailable) is registered in the field of drive status, use of the tape drive is prohibited.

The "Error date and error score" indicates the date when an error occurs in a tape drive during an export process and an error score corresponding to the type of the error. For example, past ten pieces of information are registered in the "error date and error score" with respect to one tape drive name.

The "cumulative error score value" is a cumulative value of error scores. For example, if past ten pieces of information are registered in the "error date and error score", the cumulative value of the ten error scores is stored in the "cumulative error score value". The "export delay frequency" indicates number of times the export process has not been completed first during an export parallel process.

Next, the priority of an export parallel process will be described. The priority of an export parallel process is determined considering the differences in importance between the export parallel process and each of the processes "recall", "asynchronous migration", and "urgent migration". The respective processes will be described below.

"Recall" refers to a process where data is read from the tape library device 300 when the host device 400 issues a data read request and when the requested data is not present in the disk array device 500.

After the host device 400 issues the data read request, the virtual tape control unit 230 may not normally respond to the host device 400 before the recall is completed by storing the data in the disk array device 500. On the other hand, an export parallel process is simply a backup process. Accordingly, it is preferred to avoid an export parallel process from interfering with the operation of the virtual tape library system. For this reason, recall is given higher priority than an export parallel process.

"Asynchronous migration" is a process in which data written to the disk array device 500 in response to a data write request from the host device 400 is subsequently written to the tape library device 300 at any time.

Since asynchronous migration is a process performed asynchronously with the data write request from the host device 400, it is given lower priority than recall. On the other hand, once an export process is requested by the host device 400, the export process is preferably performed as soon as possible. Accordingly, an export parallel process is preferably given higher priority than asynchronous migration.

"Urgent migration" refers to a migration process that is performed urgently to reserve an available area when the host device 400 issues a data write request and when the disk array device 500 does not afford an available area to newly store data.

The virtual tape control unit 230 may not perform a data write process in response to the request from the host device 400 before an available area is reserved in the disk array device 500. As described above, an export parallel process is simply a backup process. Accordingly, it is preferred to avoid an export parallel process from interfering with the operation of the virtual tape library system. For this reason, urgent migration is given higher priority than an export parallel process.

During execution of urgent migration, the data to be written is held in the volatile RAM 212 until the data is written to the disk array device 500. Accordingly, the data to be written may be lost. For this reason, urgent migration is preferably given higher priority than recall.

As seen above, in this embodiment, priority is set as follows: "urgent migration">"recall">"export parallel process">"asynchronous migration".

Next, an export process will be described using a flowchart.

Figure 10:
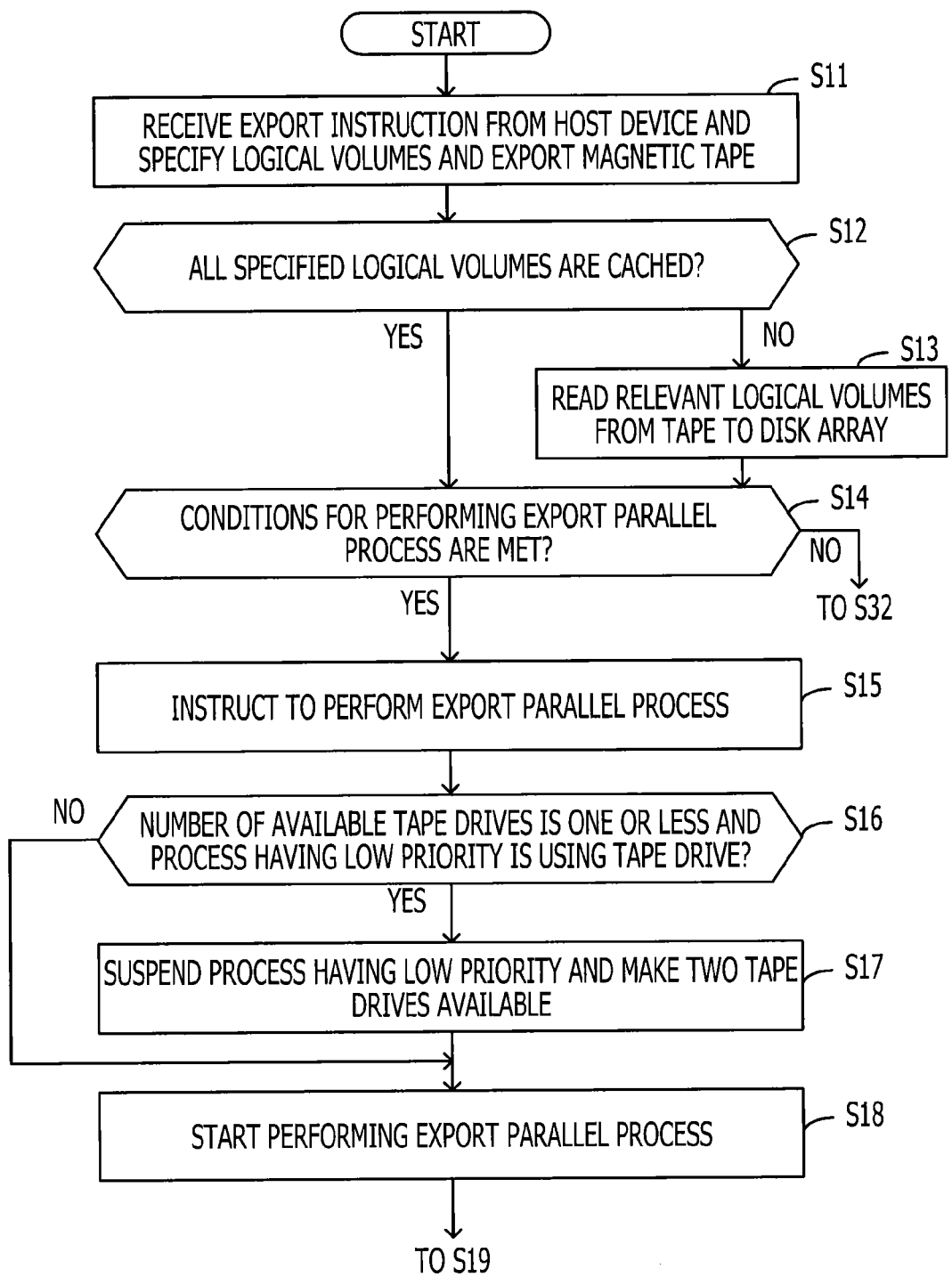
FIG. 10 is a diagram illustrating an operation flow of an export parallel process.
Figure 11:
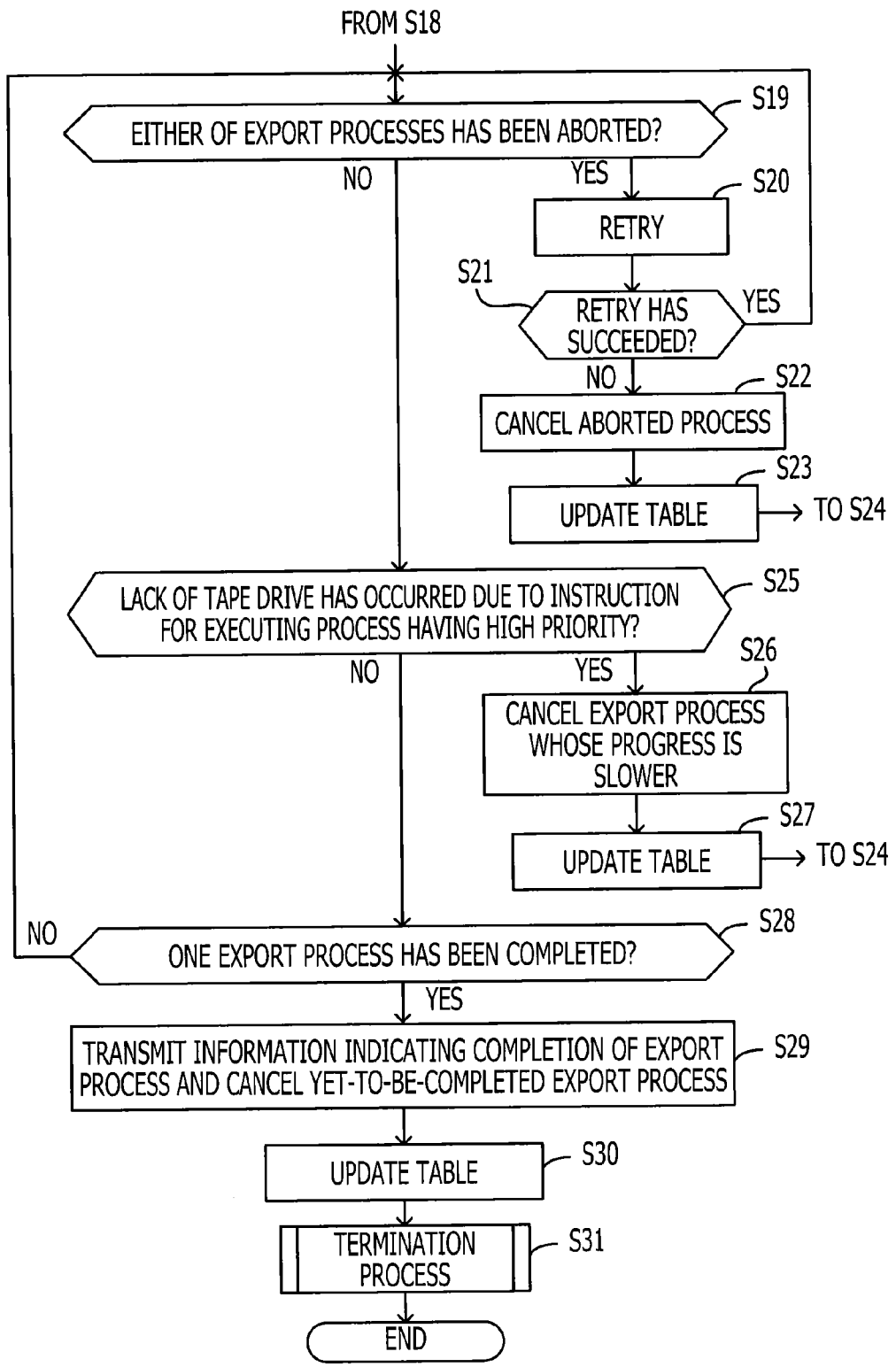
FIG. 11 is a diagram illustrating an operation flow of an export parallel process.
Figure 12:
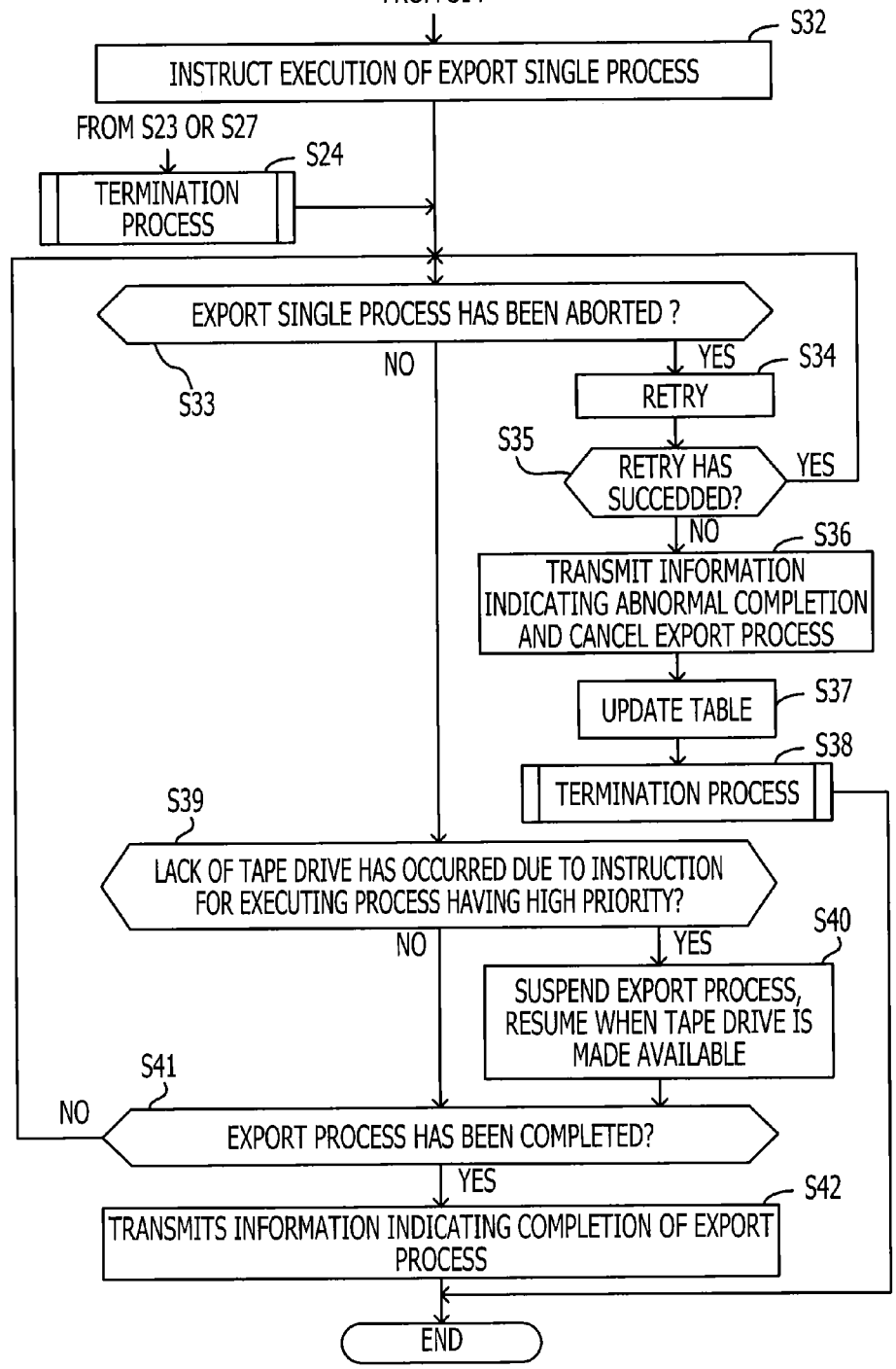
FIG. 12 is a diagram illustrating an operation flow of an export parallel process.

FIGS. 10 to 12 are diagrams illustrating a flowchart of an export parallel process. To perform an export process, the user previously registers export magnetic tapes in the control device 201 via the host device 400. The control device 201 manages the export magnetic tapes registered by the user and spare export magnetic tapes, for example, using the export magnetic tape management table 252 illustrated in FIG. 8 or another management table.

(S11) The export control unit 240 receives an export instruction from the host device 400. In response to the export instruction, the export control unit 240 specifies logical volumes to be subjected to an export process and a registered export magnetic tape.

(S12) The export control unit 240 determines whether all the specified logical volumes are cached in the disk array device 500. When not cached, the process proceeds to S13; when cached, the process proceeds to S14.

(S13) The export control unit 240 instructs the access control unit 220 to read logical volumes, which are not cached, from magnetic tapes and write the read logical volumes to the disk array device 500. The access control unit 220 performs the above-mentioned process in accordance with this instruction.

(S14) The export control unit 240 determines whether to perform an export parallel process. When an export parallel process is performed, the process proceeds to S15. When an export parallel process is not performed, the process proceeds to S32 of FIG. 12 to perform an export single process.

To determine whether to perform an export parallel process in S14, the export control unit 240 determines whether the precondition as well as two or more of the first to fifth conditions are met, as described above. The export control unit 240 determines whether the precondition is met, on the basis of command information registered in the command queue 261. The export control unit 240 also determines whether the first to third conditions are met, on the basis of records in the export magnetic tape management table 252, which correspond to the logical volumes to be subjected to an export process.

The export control unit 240 also determines a tape drive on which the export magnetic tape specified in S11 is to be mounted, on the basis of the command queue 261. The tape drive determined is the same as a tape drive used to perform an export single process. The export control unit 240 determines whether the fourth condition is met, on the basis of a record in the drive management table 253, which corresponds to the determined tape drive.

The export control unit 240 also determines whether the fifth condition is met, on the basis of a record in the export magnetic tape management table 252, which corresponds to the export magnetic tape specified in S11.

(S15) The export control unit 240 instructs the access control unit 220 to perform an export parallel process.

Specifically, the export control unit 240 generates two pieces of command information for performing export processes on respective different magnetic tapes. The export control unit 240 then outputs the two pieces of information to the access control unit 220 to cause the access control unit 220 to register the two pieces of information in the command queue 261. At this time, the export control unit 240 sets a command name representing an export process, LV names representing logical volumes to be exported, and priority lower than recall and higher than asynchronous migration, as described above, to both pieces of information. The export control unit 240 also selects one of the tape numbers of backup export magnetic tapes, sets the tape number of the export magnetic tape specified in S11 to one of the pieces of command information, and sets the tape number of the selected backup export magnetic tape to the other piece of command information.

The access control unit 220 registers, in the command queue 261, the two pieces of command information outputted from the export control unit 240.

(S16) The access control unit 220 determines whether the number of available tape drives is one or less and whether a process having lower priority than an export parallel process is using a tape drive, on the basis of the command information registered in the command queue 261. When these conditions are met, the process proceeds to S17. When these conditions are not met, the process proceeds to S18.

(S17) The access control unit 220 suspends one or two processes corresponding to pieces of command information, which have lower priority than an export parallel process, out of pieces of command information having an execution flag "1". Thus, the access control unit 220 makes two tape drives available.

Subsequently, when a tape drive becomes available and when the priority of suspended process becomes the highest among processes corresponding to the pieces of command information registered in the command queue 261, the access control unit 220 resumes the suspended process.

(S18) The access control unit 220 performs export processes based on the two pieces of command information registered in the command queue 261 in parallel in S15. In this way, execution of an export parallel process is started.

Subsequently, the access control unit 220 repeats determination processes in S19, S25, and S28, for example, at given intervals.

(S19) The access control unit 220 determines whether a data write process in either export process has been aborted. When an abort is recognized, the process proceeds to S20. When no abort is recognized, the process proceeds to S25.

(S20) The access control unit 220 retries the aborted data write process.

(S21) The access control unit 220 determines whether the retry has succeeded. When not succeeded, the process proceeds to S22. When succeeded, the process returns to S19.

(S22) The access control unit 220 transmits, to the export control unit 240, information indicating that one of the export processes has been aborted. At this time, the access control unit 220 also transmits details of the occurred error to the export control unit 240. The export control unit 240 receives the information and instructs the access control unit 220 to cancel the aborted export process. The access control unit 220 cancels the aborted export process and deletes command information corresponding to the cancelled export process from the command queue 261.

(S23) The export control unit 240 performs a process of updating the export magnetic tape management table 252 or drive management table 253, on the basis of details of the error that has occurred in the cancelled export process.

When the details of the error are related to a magnetic tape, the export control unit 240 registers an error date and an error score corresponding to the details of the error in a record, which corresponds to the magnetic tape used in the cancelled export process, in the export magnetic tape management table 252. The export control unit 240 also adds the newly registered error score to the cumulative error score value of the same record.

When the details of the error are related to a tape drive, the export control unit 240 registers an error date and an error score corresponding to the details of the error in a record, which corresponds to the tape drive used in the cancelled export process, in the drive management table 253. The export control unit 240 also adds the newly registered error score to the cumulative error score value of the same record.

(S24) The export control unit 240 performs a termination process with respect to the cancelled export process, on the basis of the export magnetic tape management table 252 and the drive management table 253. This termination process will be described later with reference to FIG. 13.

As well as performing the termination process in S24, the access control unit 220 performs operations in S33 and later of FIG. 12. Thus, the other export process, which has not been cancelled, is continued singly.

(S25) The access control unit 220 determines whether an urgent migration process or recall process having higher priority than an export parallel process has occurred and thus a lack of tape drives has occurred, on the basis of the command information registered in the command queue 261. When a lack of tape drives has occurred, the process proceeds to S26. When there are sufficient tape drives, the process proceeds to S28.

(S26) The access control unit 220 transmits information indicating that a lack of tape drives has occurred to the export control unit 240. The export control unit 240 receives the information and inquires of the access control unit 220 about progress of the respective two export processes (e.g., a size of written data).

Based on a response to the inquiry, the export control unit 240 instructs the access control unit 220 to cancel the export process whose progress is slower. The access control unit 220 cancels the export process whose progress is slower and deletes command information corresponding to the cancelled export process from the command queue 261.

(S27) The export control unit 240 performs a process of updating the export magnetic tape management table 252 and the drive management table 253.

The export control unit 240 increments by 1, the export delay frequency of a record corresponding to the magnetic tape used in the cancelled export process, in the export magnetic tape management table 252. The export control unit 240 also increments by 1, the export delay frequency of a record corresponding to the tape drive used in the export process that the export control unit 240 has instructed to cancel, in the drive management table 253.

Subsequently, the process proceeds to S24 to perform a termination process for the cancelled export process. As well as performing the termination process in S24, the access control unit 220 performs operations in S33 and later of FIG. 12. Thus, the other export process, which has not been cancelled, is continued singly.

As seen above, when, during an export parallel process, an urgent migration process or recall process having higher priority than the export parallel process has occurs and thus available tape drives are asked for, the export control unit 240 cancels the export process whose progress is slower in the export parallel process. Thus, the access control unit 220 may perform the urgent migration process or recall process using the tape drive which has become available.

(S28) The access control unit 220 determines whether either one of export processes in the export parallel process has been completed properly. When completed, the process proceeds to S29. When not completed, the process returns to S19.

(S29) The access control unit 220 transmits, to the export control unit 240, information indicating that one of the export processes has been completed. The export control unit 240 receives the information and transmits information indicating that the export process has been completed, to the host device 400. The export control unit 240 also instructs the access control unit 220 to cancel the other export process, which has not been completed. The access control unit 220 cancels the export process which has not been completed and deletes command information corresponding to the cancelled export process from the command queue 261.

As seen above, the export control unit 240 regards an export magnetic tape used in the export process that has been completed first properly, of the two export processes in the export parallel process, as an effective export completed magnetic tape and cancels the other export process.

(S30) The export control unit 240 performs a process of updating the export magnetic tape management table 252 and the drive management table 253.

The export control unit 240 increments the export delay frequency of a record, which corresponds to the magnetic tape used in the cancelled export process, in the export magnetic tape management table 252 by 1. The export control unit 240 also increments the export delay frequency of a record, which corresponds to the tape drive used in the cancelled export process, in the drive management table 253 by 1.

(S31) The export control unit 240 performs a termination process with respect to the cancelled export process. This termination process will be described later with reference to FIG. 13. Upon completion of the termination process, the export control unit 240 completes the process.

(S32) The export control unit 240 instructs the access control unit 220 to perform an export single process.

Specifically, the export control unit 240 generates command information where a command name representing an export process, LV names representing logical volumes to be exported, and a tape number of t the export magnetic tape specified in S11 are set. The export control unit 240 outputs the generated command information to the access control unit 220 to cause the access control unit 220 to register the command information in the command queue 261.

The same priority as an export parallel process, for example, is preferably set to the command information. Since an export process is performed in response to an instruction from the user, it has to be performed earlier than asynchronous migration which may be performed optionally.

The access control unit 220 registers, in the command queue 261, the command information outputted by the export control unit 240 and performs an export process at a time depending on the priority of the command registered. In this way, execution of an export single process is started.

Subsequently, the access control unit 220 repeats determination processes in S33, S39, and S41, for example, at given intervals.

(S33) The access control unit 220 determines whether a data write process in the export process under execution has been aborted. When an abort is recognized, the process proceeds to S34. When abort is not recognized, the process proceeds to S39.

(S34) The access control unit 220 retries the aborted data write process.

(S35) The access control unit 220 determines whether the retry has succeeded. When not succeeded, the process proceeds to S36. When succeeded, the process returns to S33.

(S36) The access control unit 220 transmits, to the export control unit 240, information indicating that the export process has been aborted. At this time, the access control unit 220 also transmits details of the occurred error to the export control unit 240. The export control unit 240 receives the information and transmits, to the host device 400, information indicating that the export process has been aborted. The export control unit 240 also instructs the access control unit 220 to cancel the aborted export process. The access control unit 220 cancels the aborted export process and deletes command information corresponding to the cancelled export process from the command queue 261.

(S37) The export control unit 240 performs a process of updating the export magnetic tape management table 252 or drive management table 253 on the basis of details of the error that has occurred in the cancelled export process. This process in S37 is the same as that in S23.

(S38) The export control unit 240 performs a termination process with respect to the cancelled export process, on the basis of the export magnetic tape management table 252 and the drive management table 253. This termination process will be described later with reference to FIG. 13. Upon completion of the termination process, the export control unit 240 completes the process.

(S39) The access control unit 220 determines whether an urgent migration process or recall process having higher priority than an export process has occurred and thus a lack of tape drives has occurred, on the basis of the command information registered in the command queue 261. When a lack of tape drives has occurred, the process proceeds to S40. When there are sufficient tape drives, the process proceeds to S41.

(S40) The access control unit 220 suspends the export process in execution to perform a newly instructed process. Subsequently, when a tape drive becomes available and when the priority of suspended export process becomes the highest among processes corresponding to the pieces of command information registered in the command queue 261, the access control unit 220 resumes the suspended export process.

(S41) The access control unit 220 determines whether the export process has been completed properly. When completed, the process proceeds to S42. When not completed, the process returns to S33.

(S42) The access control unit 220 transmits, to the export control unit 240, information indicating that the export process has been completed properly. The export control unit 240 receives the information and transmits information indicating that the export process has been completed properly to the host device 400.

Figure 13:
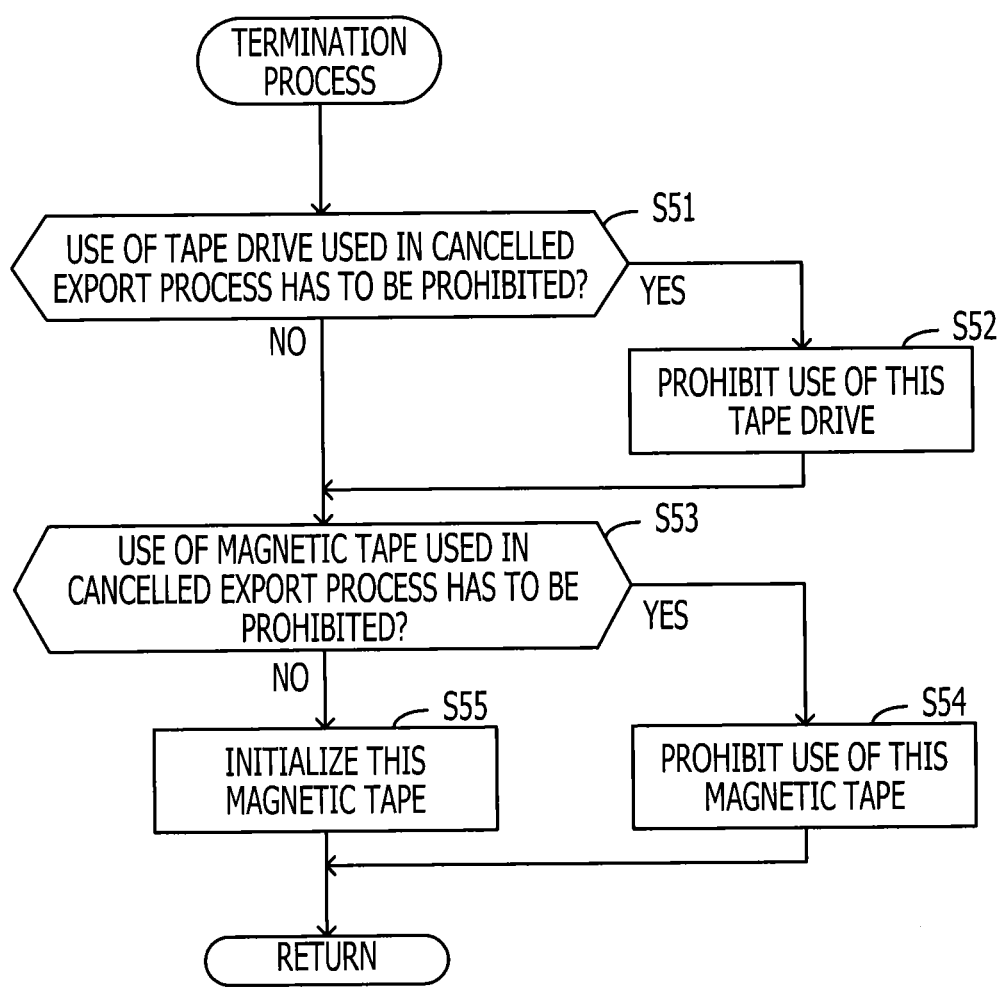
FIG. 13 is a diagram illustrating an operation flow of a termination process.

FIG. 13 is a diagram illustrating a flowchart of a termination process. This process of FIG. 13 is performed in S24, S31, and S38.

(S51) The export control unit 240 refers to a record, which corresponds to the tape drive used in the cancelled export process, in the drive management table 253. Based on the record referred to, the export control unit 240 determines whether later use of the tape drive has to be prohibited.

At least when the cumulative error score value in the record exceeds a predetermined threshold or when the export delay frequency in the record exceeds a predetermined threshold, the export control unit 240 determines that use of the tape drive has to be prohibited.

When the tape drive may be used, the process proceeds to S53. When it is determined that use of the tape drive has to be prohibited, the process proceeds to S52.

(S52) The export control unit 240 updates the drive status of the record referred to in S51 to "disable" to prohibit use of the tape drive.

(S53) The export control unit 240 refers to a record, which corresponds to the magnetic tape used in the cancelled export process, in the export magnetic tape management table 252. Based on the record referred to, the export control unit 240 determines whether later use of the magnetic tape has to be prohibited.

At least when the cumulative error score value in the record exceeds a predetermined threshold or when the export delay frequency in the record exceeds a predetermined threshold, the export control unit 240 determines that use of the magnetic tape has to be prohibited.

When the magnetic tape may be used, the process proceeds to S55. When it is determined that use of the magnetic tape has to be prohibited, the process proceeds to S54.

(S54) The export control unit 240 updates the tape status of the record referred to in S53 to "disable" to prohibit use of the magnetic tape.

(S55) The export control unit 240 outputs, to the access control unit 220, command information where a command name representing initialization of a magnetic tape and a tape name representing the magnetic tape are set, so as to cause the access control unit 220 to register the command information in the command queue 261.

The access control unit 220 registers, in the command queue 261, the command information outputted by the export control unit 240 and performs a process of initializing the magnetic tape at a time depending on the priority of the command registered. In the initialization process, the access control unit 220 invalidates data recorded in this magnetic tape, for example, by writing information indicating that this magnetic tape has been initialized, to a header area of the magnetic tape. Thus, this magnetic tape is made available again as an export magnetic tape.

Since the initialization process of an export magnetic tape does not have to be performed urgently, priority of the command information outputted in S55 is set to a lower value than a value given to asynchronous migration. Note that since the registration of the command information in S55 is performed immediately after the export process to the magnetic tape is cancelled, the magnetic tape is still mounted on a tape drive. Accordingly, if the magnetic tape is initialized in that state, the initialization process of the magnetic tape may be performed with shorter time since the magnetic tape does not have to be remounted. For this reason, priority of the command information outputted in S55 may be set to a higher value than at least a value given to asynchronous migration.

According to the process of FIG. 13, when the frequency at which the export process has not been completed first reaches a set frequency, the export magnetic tape or tape drive is registered as being unavailable. Thus, the control device 202 may correctly identify a failed part.

Further, the error scores of the export magnetic tape and tape drive that have performed the aborted export process are updated. When the cumulative error score value exceeds a threshold, the export magnetic tape or tape drive is registered as being failed. Thus, the control device 202 may correctly identify a failed part.

As described above, the control device according to the second embodiment is configured to perform an export parallel process on two export magnetic tapes upon receiving an export request from the host device. Thus, for example, when a hardware failure or tape medium failure is detected and thus one of the export processes is aborted, the other export process may be continued. As a result, a delay in the export process completion time may be suppressed. Further, a hardware failure or tape medium failure may be properly detected and the failed hardware or failed medium may be properly removed.

When a process having lower priority than an export process is being performed and thus there is no available tape drive, an export process may be performed in place of that process. Thus, a delay in the export process may be suppressed.

Since an export parallel process is performed only under specific conditions, tape drives are not indiscriminately occupied by export magnetic tapes. Accordingly, the tape drives may be used efficiently.

The status of the magnetic tape or tape drive is usually monitored based an export process that is not completed first and the score of an error which causes an abort. As a result, a failed part may be detected correctly and promptly.

The embodiments have been described as examples. The configurations of the components illustrated in the embodiments may be replaced with configurations having similar functions. Further, any other structures or processes may be added.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system comprising:
    plural drive devices each to read or write data from or to a portable recording medium; and
    a control device to
        perform a parallel process in which a first process and a second process are performed in parallel, the first process being to write specified data to a first portable recording medium via a first drive device of the plural drive devices, the second process being to write the specified data to a second portable recording medium via a second drive device of the plural drive devices, and
        cancel, upon completion of either one of the first process and the second process, the other one of the first process and the second process, wherein
            the control device determines to perform either one of the parallel process and the first process, based on a condition related to at least one of a use state of the plural drive devices and an attribute of the specified data, and
            the control device determines to perform the parallel process when a sum of numbers of available drive devices and suspendable drive devices both of the plural drive devices is two or more, the available drive devices performing neither reading data nor writing data, the suspendable drive devices performing a third process having lower priority than the parallel process.

2. The storage system according to claim 1, wherein the control device causes, when the control device has determined to perform the parallel process and when number of the available drive devices is one or less, a third drive device performing a fourth process having lower priority than the parallel process to suspend the fourth process to perform the parallel process using the third drive device as the second drive device.

3. The storage system according to claim 1, wherein the control device cancels one process which is slower in progress between the first process and the second process, when a third process having higher priority than the parallel process occurs and when all of the plural drive devices are performing reading data or writing data.

4. The storage system according to claim 1, further comprising:
    a cache device to store data written or read by a host device, wherein
    the parallel process has lower priority than a fourth process of writing data stored in the cache device to a third portable recording medium to generate an available area in the cache device,
    the parallel process has lower priority than a fifth process of reading required data from a fourth portable recording medium to store the required data in the cache device, the required data being required to be read by the host device, and
    the parallel process has higher priority than a sixth process of copying written data from the cache device to a fifth portable recording medium, the written data being written by the host device to the cache device in a seventh process, the sixth process being performed asynchronously with the seventh process.

5. The storage system according to claim 1, wherein the control device specifies plural pieces of data as the specified data to be written in the first process, and the control device determines to perform the parallel process when a total capacity of the plural pieces of data exceeds a predetermined first threshold or when an average of capacities of the plural pieces of data falls below a predetermined second threshold.

6. A storage system comprising:
    plural drive devices each to read or write data from or to a portable recording medium; and
    a control device to
        perform a parallel process in which a first process and a second process are performed in parallel, the first process being to write specified data to a first portable recording medium via a first drive device of the plural drive devices, the second process being to write the specified data to a second portable recording medium via a second drive device of the plural drive devices, and
        cancel, upon completion of either one of the first process and the second process, the other one of the first process and the second process, wherein
            the control device increments a frequency of a cancel with respect to the portable recording medium used in the cancelled process, and
            the control device registers, when the frequency exceeds a predetermined threshold, the portable recording medium used in the cancelled process as being unavailable.

7. A storage system comprising:
    plural drive devices each to read or write data from or to a portable recording medium; and
    a control device to
        perform a parallel process in which a first process and a second process are performed in parallel, the first process being to write specified data to a first portable recording medium via a first drive device of the plural drive devices, the second process being to write the specified data to a second portable recording medium via a second drive device of the plural drive devices, and
        cancel, upon completion of either one of the first process and the second process, the other one of the first process and the second process, wherein
            the control device increments a frequency of a cancel with respect to the drive device used in the cancelled process, and
            the control device registers, when the frequency exceeds a predetermined threshold, the drive device used in the cancelled process as being unavailable.

8. The storage system according to claim 1, wherein the control device invalidates data recorded in the portable recording medium used in the cancelled process.

9. A storage control method executed by a storage system including plural drive devices each to read or write data from or to a portable recording medium, the storage control method comprising:

performing, by the storage system, a parallel process in which a first process and a second process are performed in parallel, the first process being to write specified data to a first portable recording medium via a first drive device of the plural drive devices, the second process being to write the specified data to a second portable recording medium via a second drive device of the plural drive devices;

cancelling, upon completion of either one of the first process and the second process, the other one of the first process and the second process; and determining to perform either one of the parallel process and the first process, based on a condition related to at least one of a use state of the plural drive devices and an attribute of the specified data, wherein the storage system determines to perform the parallel process when a sum of numbers of available drive devices and suspendable drive devices both of the plural drive devices is two or more, the available drive devices performing neither reading data nor writing data, the suspendable drive devices performing a third process having lower priority than the parallel process.

10. The storage control method according to claim 9, further comprising:

causing, when the storage system has determined to perform the parallel process and when number of the available drive devices is one or less, a third drive device performing a fourth process having lower priority than the parallel process to suspend the fourth process to perform the parallel process using the third drive device as the second drive device.

11. The storage control method according to claim 9, further comprising:

cancelling one process which is slower in progress between the first process and the second process, when a third process having higher priority than the parallel process occurs and when all of the plural drive devices are performing reading data or writing data.

12. The storage control method according to claim 9, wherein the parallel process has lower priority than a fourth process of writing data stored in a cache device to a third portable recording medium to generate an available area in the cache device, the parallel process has lower priority than a fifth process of reading required data from a fourth portable recording medium to store the required data in the cache device, the required data being required to be read by a host device, and the parallel process has higher priority than a sixth process of copying written data from the cache device to a fifth portable recording medium, the written data being written by the host device to the cache device in a seventh process, the sixth process being performed asynchronously with the seventh process.

13. The storage control method according to claim 9, wherein the storage system specifies plural pieces of data as the specified data to be written in the first process, and the storage system determines to perform the parallel process when a total capacity of the plural pieces of data exceeds a predetermined first threshold or when an average of capacities of the plural pieces of data falls below a predetermined second threshold.

14. A storage control method executed by a storage system including plural drive devices each to read or write data from or to a portable recording medium, the storage control method comprising:

performing, by the storage system, a parallel process in which a first process and a second process are performed in parallel, the first process being to write specified data to a first portable recording medium via a first drive device of the plural drive devices, the second process being to write the specified data to a second portable recording medium via a second drive device of the plural drive devices;

cancelling, upon completion of either one of the first process and the second process, the other one of the first process and the second process;

incrementing a frequency of a cancel with respect to the portable recording medium used in the cancelled process; and registering, when the frequency exceeds a predetermined threshold, the portable recording medium used in the cancelled process as being unavailable.

15. A storage control method executed by a storage system including plural drive devices each to read or write data from or to a portable recording medium, the storage control method comprising:

performing, by the storage system, a parallel process in which a first process and a second process are performed in parallel, the first process being to write specified data to a first portable recording medium via a first drive device of the plural drive devices, the second process being to write the specified data to a second portable recording medium via a second drive device of the plural drive devices;

cancelling, upon completion of either one of the first process and the second process, the other one of the first process and the second process;

incrementing a frequency of a cancel with respect to the drive device used in the cancelled process; and registering, when the frequency exceeds a predetermined threshold, the drive device used in the cancelled process as being unavailable.

16. A non-transitory computer-readable recording medium storing a program that, when executed by a computer, causes the computer to execute a procedure, the procedure comprising:

performing a parallel process in which a first process and a second process are performed in parallel, the first process being to write specified data to a first portable recording medium via a first drive device, the second process being to write the specified data to a second portable recording medium via a second drive device; and cancelling, upon completion of either one of the first process and the second process, the other one of the first process and the second process; and determining to perform either one of the parallel process and the first process, based on a condition related to at least one of a use state of the plural drive devices and an attribute of the specified data, wherein said determining determines to perform the parallel process when a sum of numbers of available drive devices and suspendable drive devices both of the plural drive devices is two or more the available drive devices performing neither reading data nor writing data, the suspendable drive devices performing a third process having lower priority than the parallel process.

* * * * *

UNITED STATES PATENT AND TRADEMARK OFFICE
CERTIFICATE OF CORRECTION

| | |
|---|---|
| PATENT NO. | : 8,605,560 B2 |
| APPLICATION NO. | : 13/738013 |
| DATED | : December 10, 2013 |
| INVENTOR(S) | : Yusuke Inai |

It is certified that error appears in the above-identified patent and that said Letters Patent is hereby corrected as shown below:

In the Claims

In Column 24, Line 66, In Claim 16, delete "more" and insert -- more, --, therefor.

Signed and Sealed this
Twenty-fifth Day of March, 2014

Michelle K. Lee
*Deputy Director of the United States Patent and Trademark Office*